(12) United States Patent  
Wang et al.

(10) Patent No.: US 9,251,626 B2  
(45) Date of Patent: Feb. 2, 2016

(54) AUGMENTED REALITY SYSTEM AND METHOD USING A SINGLE MARKER

(71) Applicant: INSTITUTE FOR INFORMATION INDUSTRY, Taipei (TW)

(72) Inventors: Ren-Chiun Wang, New Taipei (TW); Shih-Shin Hu, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 189 days.

(21) Appl. No.: 14/093,125

(22) Filed: Nov. 29, 2013

(65) Prior Publication Data

US 2015/0109480 A1 Apr. 23, 2015

(30) Foreign Application Priority Data

Oct. 23, 2013 (TW) .............................. 102138244 A

(51) Int. Cl.
*G06T 19/00* (2011.01)
*H04N 5/265* (2006.01)
*G06T 11/60* (2006.01)
*H04W 4/00* (2009.01)

(52) U.S. Cl.
CPC .............. *G06T 19/006* (2013.01); *G06T 11/60* (2013.01); *H04N 5/265* (2013.01); *H04W 4/008* (2013.01)

(58) Field of Classification Search
CPC ........ H04N 5/265; G06T 11/60; H04W 4/008
See application file for complete search history.

(56) References Cited

U.S. PATENT DOCUMENTS

| | | | | |
|---|---|---|---|---|
| 2011/0242134 A1* | 10/2011 | Miller et al. | ................... | 345/633 |
| 2012/0038668 A1* | 2/2012 | Kim et al. | ..................... | 345/633 |
| 2012/0218299 A1* | 8/2012 | Hayakawa | ..................... | 345/633 |
| 2013/0155107 A1* | 6/2013 | Ashour et al. | ................ | 345/633 |
| 2013/0201217 A1* | 8/2013 | Morinaga et al. | ............. | 345/633 |
| 2013/0307874 A1* | 11/2013 | Blanchflower et al. | ........ | 345/633 |

FOREIGN PATENT DOCUMENTS

TW 201104644 2/2011

* cited by examiner

*Primary Examiner* — Maurice L McDowell, Jr.
(74) *Attorney, Agent, or Firm* — Nixon & Vanderhye P.C.

(57) ABSTRACT

An augmented reality system includes a plurality of mobile devices. Each mobile device includes: an image capturing unit capturing a real image of a target marker to generate a captured image; a storage unit storing a reference image of the target marker, an individual virtual object and a plurality of interactive composite virtual objects; a wireless communication unit capable of short-distance wireless communication with another mobile device located within a predetermined range; a processing unit determining whether the captured image matches the reference image; and a display unit controlled by the processing unit to display one of the individual virtual object, the interactive composite virtual objects and the captured image.

20 Claims, 5 Drawing Sheets

US 9,251,626 B2

AUGMENTED REALITY SYSTEM AND METHOD USING A SINGLE MARKER

CROSS-REFERENCE TO RELATED APPLICATION

This application claims priority of Taiwanese Application No. 102138244, filed on Oct. 23, 2013, the contents of which are hereby incorporated by reference.

BACKGROUND OF THE INVENTION

1. Field of the Invention

This invention relates to augmented reality, and more particularly to augmented reality system and method that use a single marker.

2. Description of the Related Art

A conventional augmented reality device disclosed in Taiwanese Patent Application No. 99123459 uses at least one marker. The conventional augmented reality device stores a plurality of virtual objects and an error message, and captures an image of the at least one marker to generate a captured image. When only one marker is present, the conventional augmented reality device displays the captured image and one of the virtual objects corresponding to the marker. When multiple markers are present and a distance between any two adjacent markers is not smaller than a predetermined distance, the conventional augmented reality device displays the captured image and multiple ones of the virtual objects corresponding respectively to the markers. When multiple markers are present and the distance between any two adjacent markers is smaller than the predetermined distance, the conventional augmented reality device displays the captured image and one of the virtual objects corresponding to the markers if the arrangement of the markers is meaningful, and displays the error message if the arrangement of the markers is not meaningful.

However, the conventional augmented reality device can not interact with other augmented reality devices to change the content displayed thereon.

SUMMARY OF THE INVENTION

Therefore, an object of the present invention is to provide an augmented reality system and an augmented reality method that can overcome the aforesaid drawbacks associated with the prior art.

According to one aspect of this invention, an augmented reality system comprises a plurality of mobile devices. Each of the mobile devices includes an image capturing unit, a storage unit, a wireless communication unit, a processing unit and a display unit. The image capturing unit captures a real image of a target marker to generate a captured image. The storage unit stores a reference image of the target marker, group identification data and augmented image data. The augmented image data includes an individual virtual object and a plurality of interactive composite virtual objects. The wireless communication unit is capable of short-distance wireless communication with any other one of the mobile devices located within a predetermined range. The processing unit is coupled to the image capturing unit, the storage unit and the wireless communication unit. The processing unit receives the captured image, and determines whether the captured image matches the reference image. The display unit is coupled to and controlled by the processing unit to display one of the individual virtual object, the interactive composite virtual objects and the captured image.

According to another aspect of this invention, an augmented reality method is to be implemented by a system that includes a plurality of mobile devices. Each of the mobile devices includes an image capturing unit, a storage unit, a wireless communication unit, a display unit, and a processing unit coupled to the image capturing unit, the storage unit, the wireless communication unit and the display unit. The augmented reality method comprises: the image capturing unit of each of the mobile devices capturing a real image of a target marker to generate a captured image; the storage unit of each of the mobile devices storing a reference image of the target marker, group identification data and augmented image data, the augmented image data including an individual virtual object and a plurality of interactive composite virtual objects; the wireless communication unit of each of the mobile devices performing short-distance wireless communication with any other one(s) of the mobile devices located within a predetermined range; the processing unit of each of the mobile devices receiving the captured image, and determining whether the captured image matches the reference image stored in the storage unit; and the display unit of each of the mobile devices being controlled by the processing unit to display one of the individual virtual object, the interactive composite virtual objects and the captured image.

According to yet another aspect of this invention, an augmented reality method is to be implemented by a system that includes a server and a plurality of mobile devices. Each of the mobile devices includes an image capturing unit, a storage unit, a wireless communication unit, a display unit, and a processing unit coupled to the image capturing unit, the storage unit, the wireless communication unit and the display unit. The augmented reality method comprises: the image capturing unit of each of the mobile devices capturing a real image of a target marker to generate a captured image; the storage unit of each of the mobile devices storing a reference image of the target marker, group identification data and augmented image data, the augmented image data including an individual virtual object and a plurality of interactive composite virtual objects; the wireless communication unit of each of the mobile devices performing short-distance wireless communication with any other one(s) of the mobile devices located in a predetermined range, and performing wireless communication with the server; the processing unit of each of the mobile devices receiving the captured image, and determining whether the captured image matches the reference image stored in the storage unit; and the display unit of each of the mobile devices being controlled by the processing unit to display one of the individual virtual object, the interactive composite virtual objects and the captured image.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
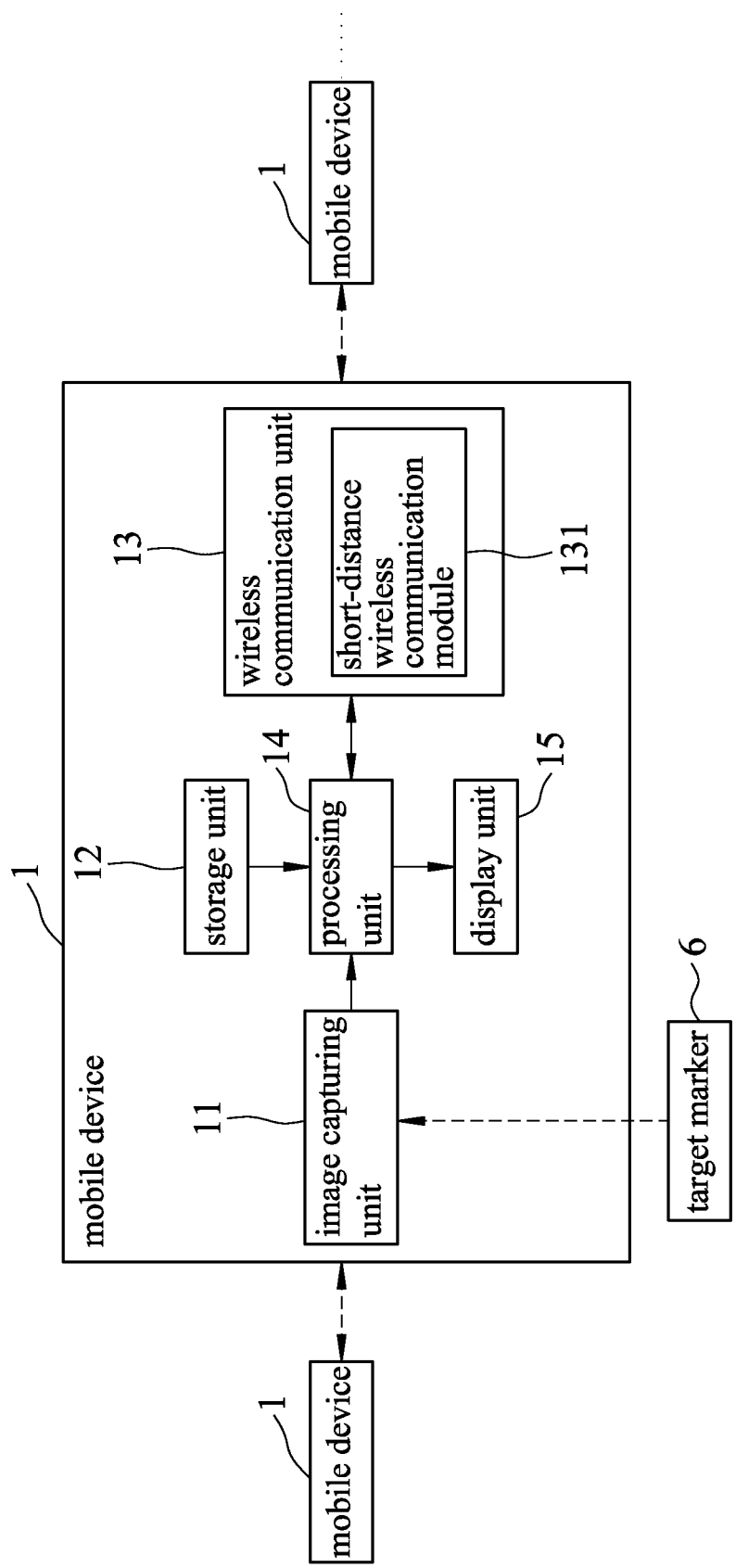
FIG. 1 is a schematic block diagram illustrating the first preferred embodiment of an augmented reality system according to this invention.

Referring to FIG. 1, the first preferred embodiment of an augmented reality system according to this invention is shown to include a plurality of mobile devices 1. Each mobile device 1 has a device identification code and is assigned an individual information content. One of the mobile devices 1 is designated as a master device. The other mobile devices 1 are designated as slave devices. Each slave device is assigned a respective fixed priority.

Each mobile device 1 includes an image capturing unit 11, a storage unit 12, a wireless communication unit 13, a processing unit 14 and a display unit 15. The image capturing unit 11 captures a real image of a target marker 6 to generate a captured image. The storage unit 12 stores a reference image of the target marker 6, group identification data and augmented image data. The reference image is a clear image of the target marker 6 in a format such as, but not limited to, GIF or JPEG. The group identification data includes the device identification codes of the mobile devices 1, and is used for distinguishing different groups of mobile devices 1. The augmented image data includes an individual virtual object associated with the individual information content of the respective mobile device 1, and a plurality of interactive composite virtual objects. Each interactive composite virtual object is associated with a composite information content, which relates to the individual information contents of a respective group of at least two of the mobile devices 1. An identical set of interactive composite virtual objects are stored in the storage unit 12 of each of the mobile devices 1. For example, when the number of the mobile devices 1 is N, the total number of the interactive composite virtual objects would be $\Sigma_{i=2}^{N} C_i^N$. The wireless communication unit 13 includes a short-distance wireless communication module 131, such as a near field communication (NFC) module, a radio frequency identification (RFID) communication module, a Bluetooth® communication module or an infrared communication module. The wireless communication unit 13 is capable of short-distance wireless communication with any other mobile device 1 located within a predetermined range from the corresponding mobile device 1 through the short-distance wireless communication module 131. The processing unit 14 is coupled to the image capturing unit 11, the storage unit 12 and the wireless communication unit 13, and receives the captured image from the image capturing unit 11. The processing unit 14 is operable to determine whether the captured image matches the reference image stored in the storage unit 12. If the captured image presents the whole target marker 6 clearly, it is determined that the captured image matches the reference image. Otherwise (e.g., if the captured image presents only a portion of the target marker 6), it is determined that the captured image does not match the reference image. Moreover, the processing unit 14 is operable to send and receive join state information, which indicates the device identification codes of a corresponding group of mobile device 1 and other mobile device(s) in proximity to each other, through the wireless communication unit 13. The display unit 15 is coupled to and controlled by the processing unit 14. When it is determined by the processing unit 14 that the captured image does not match the reference image, the display unit 15 displays the captured image. When it is determined by the processing unit 14 that the captured image matches the reference image and none of the other mobile devices 1 is in proximity to the wireless communication unit 13 (e.g., none of the other mobile devices 1 is located within the predetermined range from the wireless communication unit 13 thereof), the display unit 15 displays the individual virtual object (this is hereinafter referred to as the individual display procedure). When it is determined by the processing unit 14 that the captured image matches the reference image and at least one other mobile device 1 is in proximity to the wireless communication unit 13 (i.e., the corresponding mobile device 1 and the at least one other mobile device 1 are located within the predetermined range of each other), the display unit 15 displays one of the interactive composite virtual objects that is associated with the respective group of the mobile devices 1 in proximity to each other (i.e., the corresponding mobile device 1 and the at least one other mobile device 1).

In this embodiment, designation of the master and slave devices, assignment of the individual information content to each mobile device 1, and assignment of the priority to each slave device are predetermined. The reference image of the target marker 6, the group identification data and the augmented image data are pre-stored in the storage unit 12 of each mobile device 1.

European geography learning is taken as an example for illustration herein. In this example, the number of the mobile devices 1 is three. The three mobile devices 1 are referred to hereinafter as first to third mobile devices, respectively, with the first mobile device being designated the master device, and the second and third mobile devices being designated the slave devices. The priority of the second mobile device is higher than that of the third mobile device. The individual information contents of the first to third mobile devices are a Greek flag, a Spanish flag and an Italian flag, respectively. The individual virtual objects stored in the first to third mobile devices are an image of a Greek flag, an image of a Spanish flag and an image of an Italian flag, respectively. There are four interactive composite virtual objects in total stored in each mobile device 1, and the interactive composite virtual objects are an image of a map of Greece and Spain, an image of a map of Greece and Italy, an image of a map of Spain and Italy, and an image of a map of Greece, Spain and Italy. It is assumed that a captured image is taken by each mobile device 1 and is determined to match the reference image. When the first to third mobile devices are far away from each other, the first to third mobile devices display the image of the Greek flag, the image of the Spanish flag, and the image of the Italian flag, respectively. When the first and second mobile devices are in proximity to each other and far away from the third mobile device, the third mobile device displays the image of the Italian flag, and the first mobile device sends the join state information, which indicates the device identification codes of the first and second mobile devices, to the second mobile device, so that each of the first and second mobile devices displays the image of the map of Greece and Spain. When the first and third mobile devices are in proximity to each other and far away from the second mobile device, the second mobile device displays the image of the Spanish flag, and the first mobile device sends the join state information, which indicates the device identification codes of the first and third mobile devices, to the third mobile device, so that each of the first and third mobile devices displays the image of the map of Greece and Italy. When the second and third mobile devices are in proximity to each other and far away from the first mobile device, the first mobile device displays the image of the Greek flag, and the second mobile device sends the join state information, which indicates the device identification codes of the second and third mobile devices, to the third mobile device, so that each of the second and third mobile devices displays the image of the map of Spain and Italy. When the first to third mobile devices are in proximity to one another, the first mobile device sends the join state information, which indicates the device identification codes of the first to third mobile devices, to the second and third mobile devices, so that each of the first to third mobile devices displays the image of the map of Greece, Spain and Italy.

Figure 2:
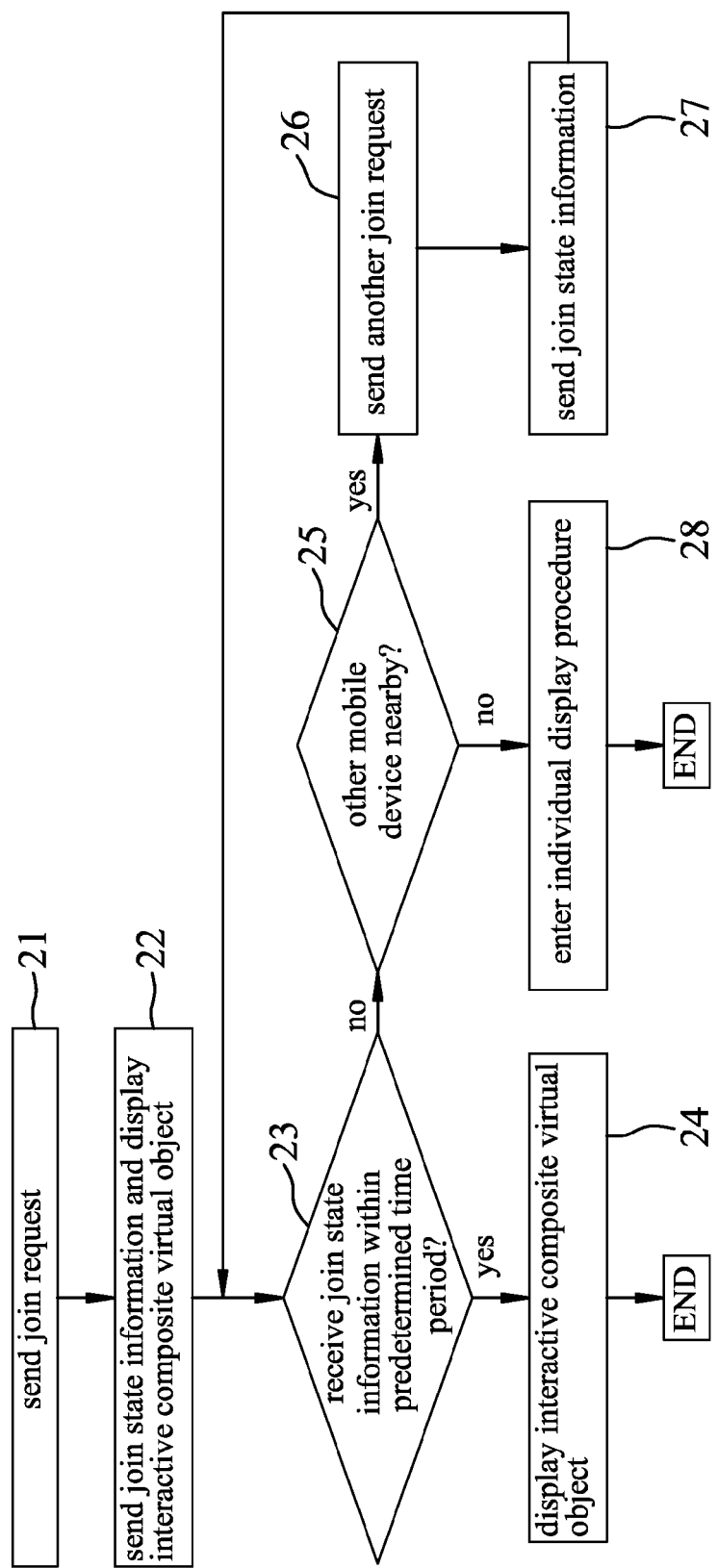
FIG. 2 is a flow chart illustrating an interactive display procedure of an augmented reality method performed by the first preferred embodiment.

Referring to FIGS. 1 and 2, when at least two mobile devices 1 are in proximity of each other, the augmented reality system of this embodiment performs an interactive display procedure of an augmented reality method includes the following steps 21-28 to determine which one of the interactive composite virtual objects is to be displayed, assuming that the captured image is determined to match the reference image for each of the at least two mobile devices 1. The augmented reality method further includes the aforementioned individual display procedure. In addition, as described above, if the captured image does not match the reference image, the captured image will be displayed. Before entering step 21, it is assumed that at least one slave device is nearby the master device, i.e., located within the predetermined range of the master device. In step 21, each such slave device sends a join request, which includes the device identification code thereof, to the master device through the wireless communication unit 13 thereof.

In step 22, upon receipt of the join request(s) by the wireless communication unit 13 of the master device, the processing unit 14 of the master device obtains the device identification code(s) from the join request(s), and sends corresponding join state information, which indicates the device identification codes of the master device and the slave device(s), the join request(s) of which has (have) been received by the master device, to the slave device(s) located within the predetermined range of the master device. In addition, in step 22, the master device displays one of the interactive composite virtual objects corresponding to a respective group of the mobile devices 1 on the display unit 15 thereof, where the respective group includes the master device and the slave device(s), the join request(s) of which has (have) been received by the master device.

In step 23, for each slave device having sent the join request, the processing unit 14 thereof determines whether the wireless communication unit 13 has received the join state information from the master device within a predetermined time period after the join request is sent. If affirmative, the flow proceeds to step 24. Otherwise, the flow goes to step 25.

In step 24, for each slave device having received the join state information, the processing unit 14 thereof determines, based on the join state information, one of the interactive composite virtual objects corresponding to the respective group of the mobile devices, the device identification codes of which are indicated by the join state information, to be displayed on the display unit 15.

In step 25, for each slave device that did not receive the join state information from the master device, the slave device determines whether there is any other mobile device 1 located within the predetermined range thereof. If affirmative, the process proceeds to step 26; otherwise, the process proceeds to step 28 for the slave device to enter the individual display procedure as described above. In step 26, the slave device sends another join request, which in addition to the device identification code thereof, further includes the priority thereof, to any nearby mobile device 1 located within the predetermined range through the wireless communication unit 13 thereof.

In step 27, in the absence of the master device, the slave device in receipt of at least one join request from another slave device and having the highest priority within the group of nearby slave devices uses the processing unit 14 thereof to obtain the device identification code(s) from the join request(s) received thereby, and sends corresponding join state information, which indicates the device identification code thereof, as well as the device identification code(s) of the other slave device(s), the join request(s) of which has (have) been received thereby, to the other slave device(s) with lower priority(ies).

Following step 27, the process returns to step 23 to determine and display an interactive composite virtual object that corresponds to the group of nearby slave devices based on the join state information.

Steps 21-24 are repeated such that, with the leave of any slave device from the group consisted of the master device and the slave device(s) located within the predetermined range of the master device and/or the join of any slave device into the group, a different, corresponding interactive composite virtual object will be displayed by the master and slave device(s) of the group.

It is noted that, by steps 26 and 27, even if the master device leaves the group after step 21 and before step 22, the slave device that has the highest priority from among the members of the group will take the role of the master device for the slave devices in the group to display a proper interactive composite virtual object. Preferably, if the group of nearby mobile devices 1 does not include the master device at the beginning of step 21, or if the composition of the group changes (with old mobile device(s) 1 leaving and/or with new one(s) joining, in the absence of the master device, the slave device with the highest priority in the group will automatically take charge of the work performed by the master device in step 22.

In view of the above, each mobile device 1 can interact with the other mobile device(s) 1 to change the content displayed on the display unit 15 thereof.

Figure 3:
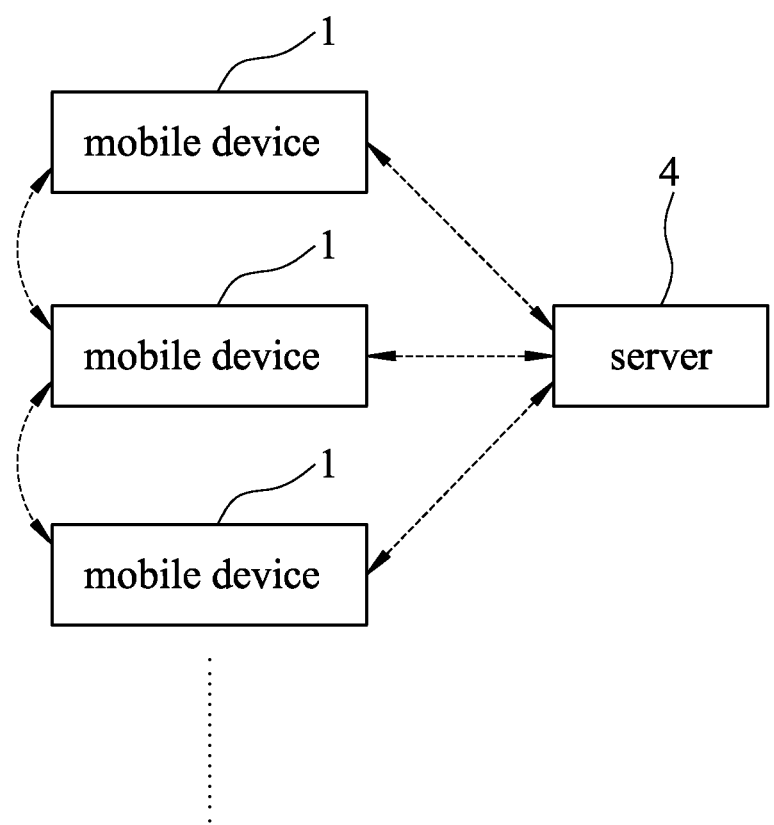
FIG. 3 is a schematic block diagram illustrating the second preferred embodiment of an augmented reality system according to this invention.
Figure 4:
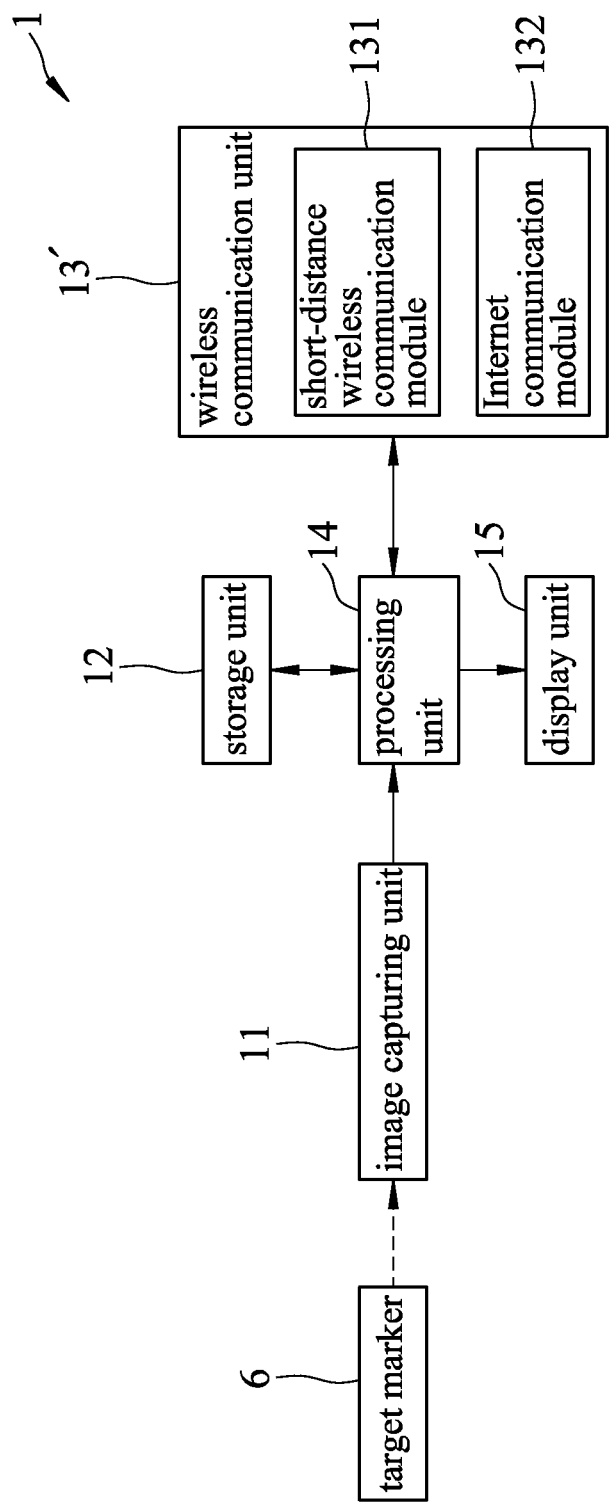
FIG. 4 is a schematic block diagram illustrating a mobile device of the second preferred embodiment.

FIGS. 3 and 4 illustrate the second preferred embodiment of an augmented reality system according to this invention, which is a modification of the first preferred embodiment. Unlike the first preferred embodiment, the augmented reality system of the second preferred embodiment further includes a server 4. Each mobile device 1 is capable of establishing a communication link with the server 4. Once the server 4 is in communication with every single one of the mobile devices 1, the server 4 performs the assignment of the individual information content to each mobile device 1, and the designation of the master and slave devices.

In this embodiment, the assignment of the individual information content to each mobile device 1, and the designation of the master and slave devices are randomly determined by the server 4. The wireless communication unit 13' of each mobile device 1 further includes an Internet communication module 132, and performs wireless communication with the server 4 through the Internet communication module 132. The reference image of the target marker 6, the group identification data and the augmented image data stored in the storage unit 12 of each mobile device 1 are previously downloaded from the server 4 upon establishing the communication link with the server 4.

Figure 5:
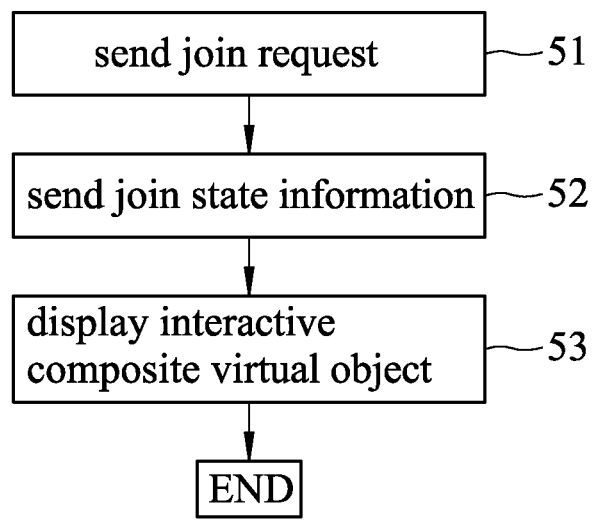
FIG. 5 is a flow chart illustrating an interactive display procedure of an augmented reality method performed by the second preferred embodiment.

Referring to FIGS. 3-5, when at least two mobile devices 1 are located within the predetermined range of each other, the augmented reality system of this embodiment performs an interactive display procedure of an augmented reality method, including the following steps 51-53 to determine which one of the interactive composite virtual objects is to be displayed. The augmented reality method further includes the aforesaid individual display procedure.

In step 51, each of the mobile devices 1 sends a join request, which includes the device identification thereof, through the wireless communication unit 13' thereof.

In step 52, upon receipt of the join requests, the server 4 obtains the device identification codes from the join requests, and sends corresponding join state information, which indicates the device identification codes of the nearby mobile devices 1, the join requests of which have been received by the server 4.

In step 53, upon receipt of the join state information, each of the mobile devices 1 uses the processing unit 14 thereof to determine, based on the join state information, one of the interactive composite virtual objects corresponding to the device identification codes indicated by the join state information to be displayed on the display unit 15 thereof upon determining that the captured image matches the reference image.

In this embodiment, if the communication link between the server 4 and one of the mobile devices 1 is cut off, it is the master device that sends out the join state information in a manner similar to what is disclosed in the first preferred embodiment. Preferably, the server 4 further assigns a respective fixed priority to each slave device, and if the communication link with the server 4 is disconnected and the master device is not present, the slave device that has the highest priority from among the group of nearby mobile devices 1 takes charge of the work of the master device, as discussed earlier with reference to the first preferred embodiment.

It is noted that, in this embodiment, the designation of the master and slave devices is randomly determined by the server 4. However, such designation may be preset in the mobile devices 1 if communication with the server 4 cannot be established.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An augmented reality system comprising a plurality of mobile devices, each of said mobile devices including:
   an image capturing unit for capturing a real image of a target marker to generate a captured image;
   a storage unit for storing a reference image of the target marker, group identification data and augmented image data, the augmented image data including an individual virtual object and a plurality of interactive composite virtual objects;
   a wireless communication unit capable of short-distance wireless communication with any other one of said mobile devices located within a predetermined range;
   a processing unit coupled to said image capturing unit, said storage unit and said wireless communication unit, said processing unit receiving the captured image, and determining whether the captured image matches the reference image stored in said storage unit; and
   a display unit coupled to and controlled by said processing unit to display one of the individual virtual object, the interactive composite virtual objects and the captured image.

2. The augmented reality system of claim 1, wherein each of said mobile devices has a device identification code and is assigned an individual information content, the group identification data including the device identification codes of said mobile devices.

3. The augmented reality system of claim 2, wherein said mobile devices includes a master device and a plurality of slave devices;
   wherein when said master device and any of said slave devices are located within the predetermined range, said wireless communication unit of each of said slave devices located within the predetermined range sends a join request to said master device, and said wireless communication unit of said master device sends corresponding join state information to said slave devices located within the predetermined range upon receipt of any of the join request(s).

4. The augmented reality system of claim 3, wherein, upon receipt of the join state information by any of said slave devices located within the predetermined range through said wireless communication unit, for each of said master device and said slave device(s) having received the join state information, said display unit displays one of the interactive composite virtual objects corresponding to a combination of said master device and said slave device(s), the join request(s) of which has(have) been received by said master device, upon determining by said processing unit that the captured image matches the reference image.

5. The augmented reality system of claim 3, wherein the join request includes the device identification code of the corresponding one of said slave devices.

6. The augmented reality system of claim 5, wherein each of said slave devices has a respective priority.

7. The augmented reality system of claim 6, wherein, when said slave devices that are located within the predetermined range fail to receive the join state information from said master device within a predetermined time period after sending of the join requests, each of said slave devices having failed to receive the join state information sends another join request, which includes the priority thereof, to the other one(s) of said slave devices located within the predetermined range through said wireless communication unit, and said wireless communication unit of one of said slave device(s) that is located within the predetermined range and that has the highest priority sends the corresponding join state information upon receipt of any of the join request(s).

8. The augmented reality system of claim 2, further comprising a server, wherein said wireless communication unit of each of said mobile device is capable of wireless communication with said server, said mobile devices including a master device and a plurality of slave devices;
   wherein when said master device and any of said slave devices are located within the predetermined range, said wireless communication unit of each of said master device and said slave device(s) located within the predetermined range sends a join request to one of said master device and said server, and said one of said master device and said server sends corresponding join state information to said master device and said slave device(s) located within the predetermined range upon receipt of any of the join requests.

9. The augmented reality system of claim 8, wherein, upon receipt of the join state information by any of said master device and said slave devices located within the predetermined range through said wireless communication unit, for each of said master and slave devices having received the join state information, said display unit displays one of the interactive composite virtual objects corresponding to a combination of said master and slave devices, the join requests of which have been received by said one of said master device and said server, upon determining by said processing unit that the captured image matches the reference image.

10. The augmented reality system of claim 8, wherein said one of said master device and said server is said master device when a communication link between said server and one of said mobile devices is cut off.

11. The augmented reality system of claim 1, wherein said wireless communication unit of each of said mobile devices includes an Internet communication module or a short-distance wireless communication module.

12. The augmented reality system of claim 11, wherein said short-distance wireless communication module is one of a near field communication (NFC) module, a radio frequency identification (RFID) communication module, a Bluetooth® communication module and an infrared communication module.

13. An augmented reality method to be implemented by a system that includes a plurality of mobile devices, each of the mobile devices including an image capturing unit, a storage unit, a wireless communication unit, a display unit, and a processing unit coupled to the image capturing unit, the storage unit, the wireless communication unit and the display unit, said augmented reality method comprising:
  the image capturing unit of each of the mobile devices capturing a real image of a target marker to generate a captured image;
  the storage unit of each of the mobile devices storing a reference image of the target marker, group identification data and augmented image data, the augmented image data including an individual virtual object and a plurality of interactive composite virtual objects;
  the wireless communication unit of each of the mobile devices performing short-distance wireless communication with any other one(s) of the mobile devices located within a predetermined range;
  the processing unit of each of the mobile devices receiving the captured image, and determining whether the captured image matches the reference image stored in the storage unit; and
  the display unit of each of the mobile devices being controlled by the processing unit to display one of the individual virtual object, the interactive composite virtual objects and the captured image.

14. The augmented reality method of claim 13, wherein each of the mobile devices has a device identification code and is assigned an individual information content, the group identification data including the device identification codes of the mobile devices, the mobile devices including a master device and a plurality of slave devices, said augmented reality method further comprising:
  when the master device and any of the slave devices are located within the predetermined range, the wireless communication unit of each of the slave devices located within the predetermined range sending a join request to the master device; and
  the wireless communication unit of the master device sending corresponding join state information to the slave device(s) located within the predetermined range upon receipt of any of the join request(s).

15. The augmented reality method of claim 14, wherein, upon receipt of the join state information by any of the slave device(s) located within the predetermined range through the wireless communication unit, for each of the master device and the slave devices having received the join state information, the display unit displays one of the interactive composite virtual objects corresponding to a combination of the master device and the slave device(s), the join request(s) of which has(have) been received by the master device, upon determining by the processing unit that the captured image matches the reference image.

16. The augmented reality method of claim 14, wherein each of the slave devices has a respective priority, said augmented reality method further comprising:
  when the slave devices that are located within the predetermined range fail to receive the join state information from the master device within a predetermined time period after sending of the join requests, each of the slave devices located within the predetermined range sending another join request, which includes the priority thereof, to the other one(s) of the slave devices located within the predetermined range through the wireless communication unit; and
  the wireless communication unit of one of the slave devices that is located within the predetermined range and that has the highest priority sending the corresponding join state information upon receipt of any of the join request(s).

17. An augmented reality method to be implemented by a system that includes a server and a plurality of mobile devices, each of the mobile devices including an image capturing unit, a storage unit, a wireless communication unit, a display unit, and a processing unit coupled to the image capturing unit, the storage unit, the wireless communication unit and the display unit, said augmented reality method comprising:
  the image capturing unit of each of the mobile devices capturing a real image of a target marker to generate a captured image;
  the storage unit of each of the mobile devices storing a reference image of the target marker, group identification data and augmented image data, the augmented image data including an individual virtual object and a plurality of interactive composite virtual objects;
  the wireless communication unit of each of the mobile devices performing short-distance wireless communication with any other one(s) of the mobile devices located within a predetermined range, and performing wireless communication with the server;
  the processing unit of each of the mobile devices receiving the captured image, and determining whether the captured image matches the reference image stored in the storage unit; and
  the display unit of each of the mobile devices being controlled by the processing unit to display one of the individual virtual object, the interactive composite virtual objects and the captured image.

18. The augmented reality method of claim 17, wherein each of the mobile devices has a device identification code and is assigned an individual information content, the group identification data including the device identification codes of the mobile devices, the mobile devices including a master device and a plurality of slave devices, said augmented reality method further comprising:
  when the master device and any of the slave devices are located within the predetermined range, the wireless communication unit of each of the master device and the slave device(s) located within the predetermined range sending a join request to one of the master device and the server; and
  said one of the master device and the server sending corresponding join state information to the master device and the slave device(s) located within the predetermined range upon receipt of any of the join requests.

19. The augmented reality method of claim 18, wherein, upon receipt of the join state information by any of the master device and the slave device(s) located within the predetermined range through the wireless communication unit, for each of the master and slave devices having received the join state information, the display unit displays one of the interactive composite virtual objects corresponding to a combination of the master and slave devices, the join requests of which have been received by said one of the master device and the server, upon determining by the processing unit that the captured image matches the reference image.

20. The augmented reality method of claim 18, wherein said one of the master device and the server is the master device when a communication link between the server and one of the mobile devices is cut off.

* * * * *